Figure 1B:
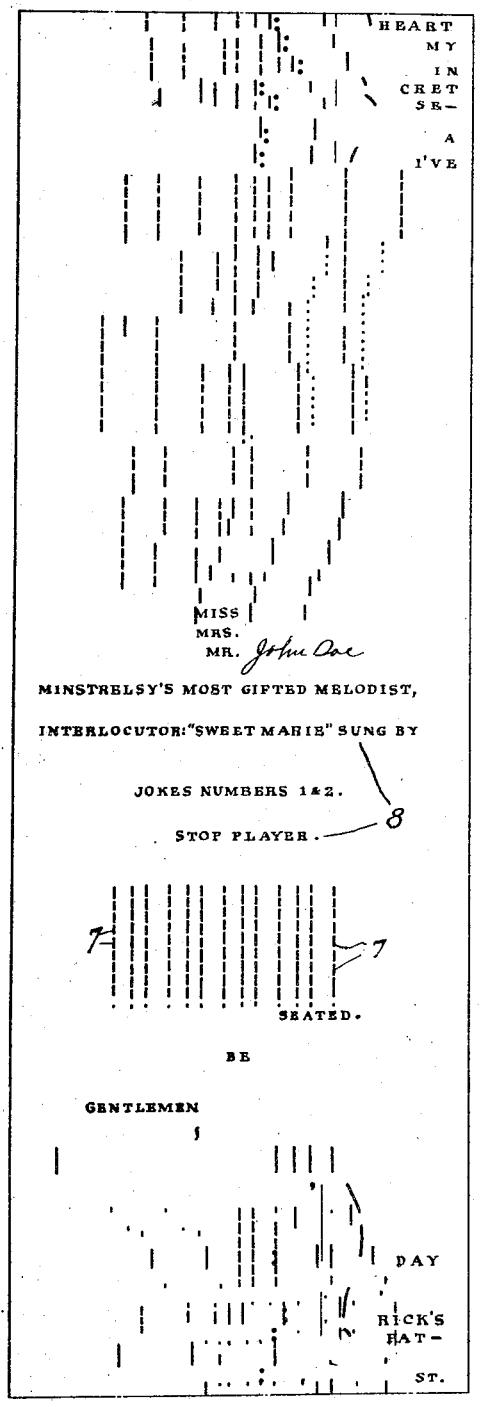

Dec. 30, 1924.
H. G. MILLER
1,521,559
MUSIC SHEET
Filed March 21, 1921 4 Sheets-Sheet 1
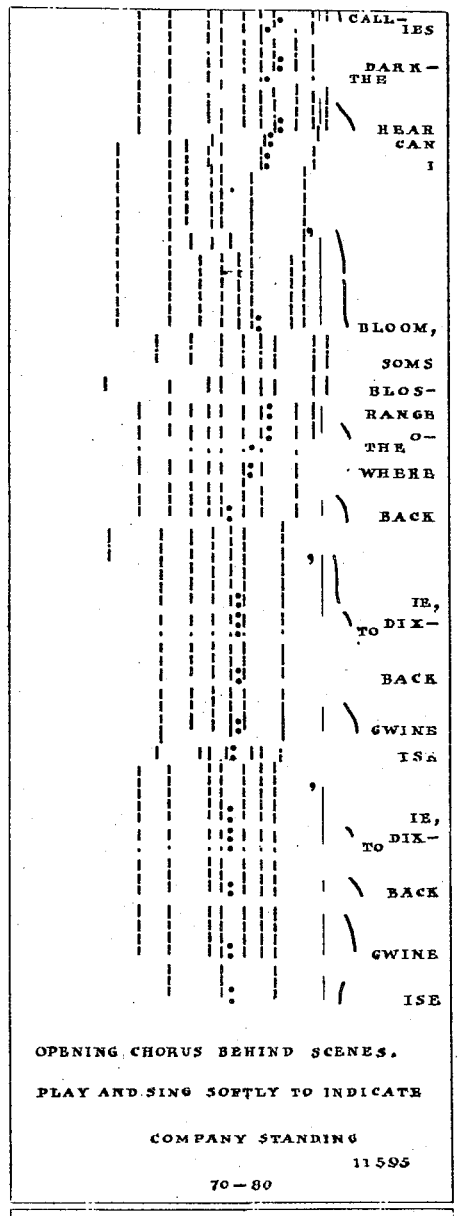
Fig. 1.
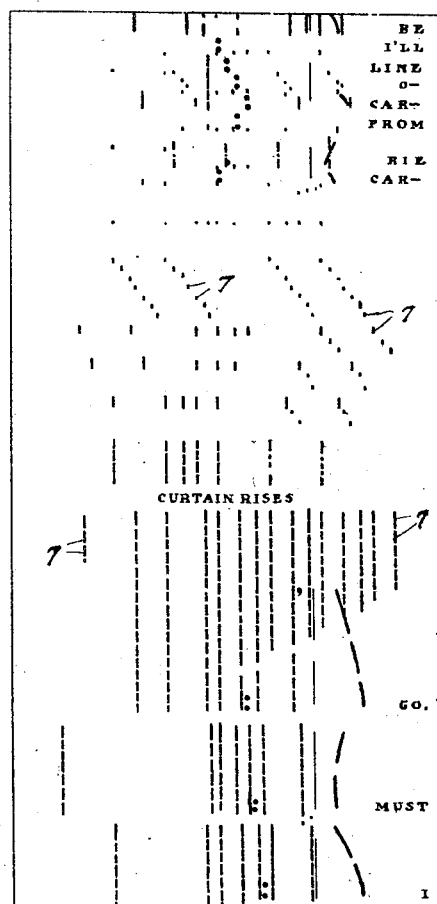
Fig. 1ª
Inventor
Harry G. Miller
By Wood & Wood
Attorneys Dec. 30, 1924.

H. G. MILLER

MUSIC SHEET

Filed March 21, 1921

1,521,559

4 Sheets-Sheet 2

Dec. 30, 1924.　　　　　　　　　　　　　　　　1,521,559
H. G. MILLER
MUSIC SHEET
Filed March 21, 1921　　　4 Sheets-Sheet 3
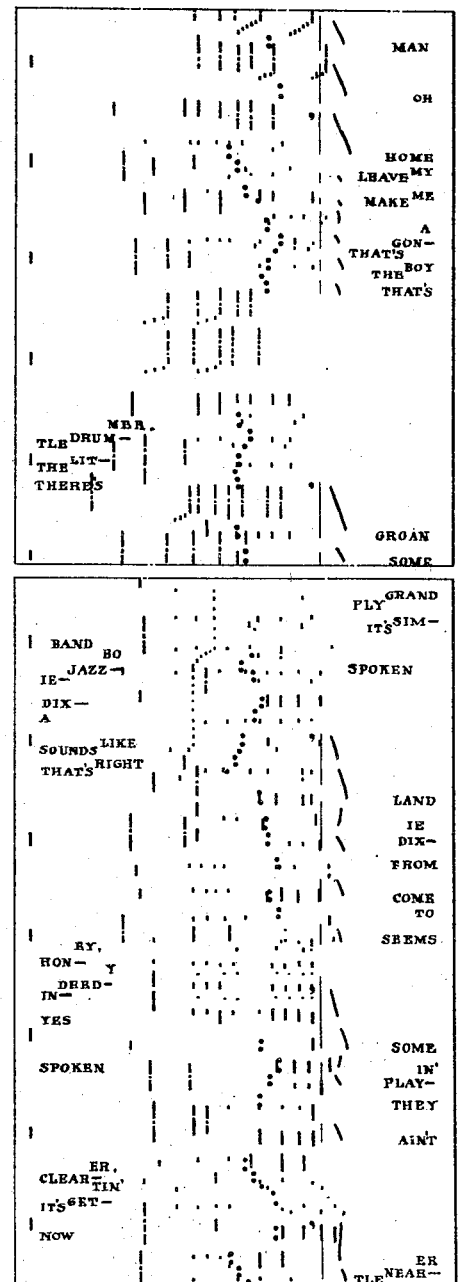
Fig. 2ª
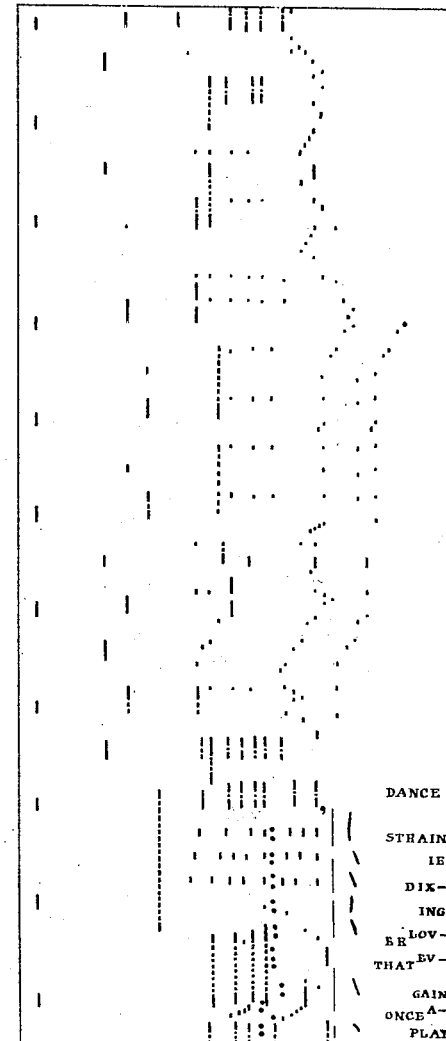
Fig. 2ᵇ
Inventor:
Harry G. Miller.
By Wood + Wood
Attorneys Dec. 30, 1924.
H. G. MILLER
MUSIC SHEET
Filed March 21, 1921 4 Sheets-Sheet 4
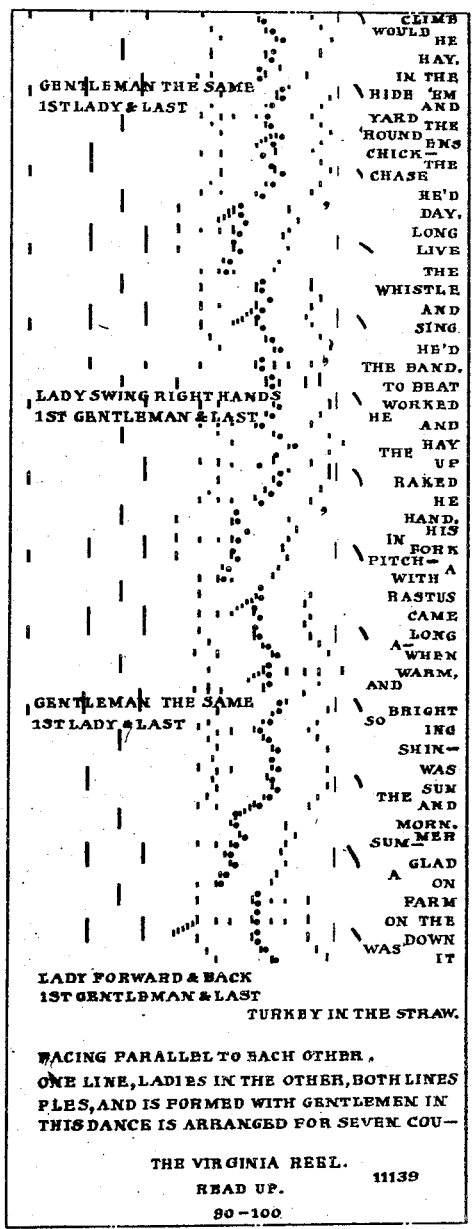
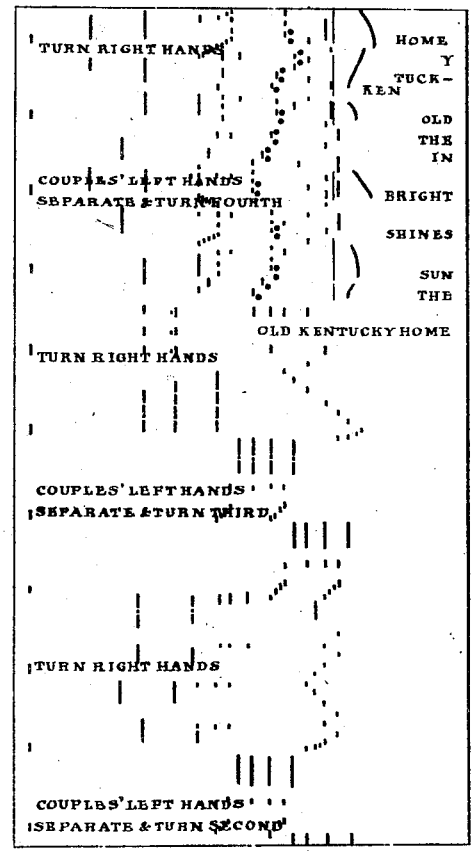

Patented Dec. 30, 1924.

1,521,559

UNITED STATES PATENT OFFICE.

HARRY G. MILLER, OF CINCINNATI, OHIO, ASSIGNOR TO THE VOCALSTYLE MUSIC COMPANY, OF CINCINNATI, OHIO, A CORPORATION OF OHIO.

MUSIC SHEET.

Application filed March 21, 1921. Serial No. 453,940.

*To all whom it may concern:*

Be it known that I, HARRY G. MILLER, a citizen of the United States, and residing at Cincinnati, in the county of Hamilton and State of Ohio, have invented a new and useful Improvement in Music Sheets, of which the following specification is a full disclosure.

This invention relates to the adaptation of a record strip, for mechanical reproduction of a musical work, for printed and descriptive music scoring instructions arranged chronologically progressive of the record strip for the rendition of a musical performance or entertainment.

An object of the invention is the production of a music roll or record strip for mechanical reproduction of a musical work upon which certain indicia are printed, in the form of directions, and in accurate and definite relation to the note aperture of the said sheet, to enable the operator of the musical instrument to act as a director of a home minstrel show or similar entertainment, the said indicia being in the form of words or signs, placed at either or both side margins of the music sheet; a book of jokes or similar matter being furnished with each roll, the dialogues, monologues, etc., therein contained being spoken by the individuals of the company at the proper intervals, during which intervals the operation of the musical instrument is discontinued.

Another object is the production of a music roll or record strip having printed thereon, at either or both side margins, in definite relation to the note apertures of said sheet, certain words to be spoken, sung, or alternately spoken and sung by two or more performers in the rendition of a home vaudeville entertainment, the player-piano operator providing the necessary musical accompaniments and otherwise directing the entertainment.

An additional object is the production of a music-roll or record strip, which will serve as a means for furnishing the music and directions for a folk dance (such as the Virginia reel), the directions being printed upon the sheet, in definite relation to the note apertures of the same, at one side margin thereof, the printed lines furnishing a means whereby the operator of the musical instrument can furnish the music and direct the dance figure.

Other objects and certain advantages will be set forth in the following description of the drawings, forming a part of this specification, in which:

Figs. 1, 1ª, and 1ᵇ, are fragmentary face views of sections of a music-sheet, having printed thereon indicia for the direction of a home minstrel performance.

Figure 2:
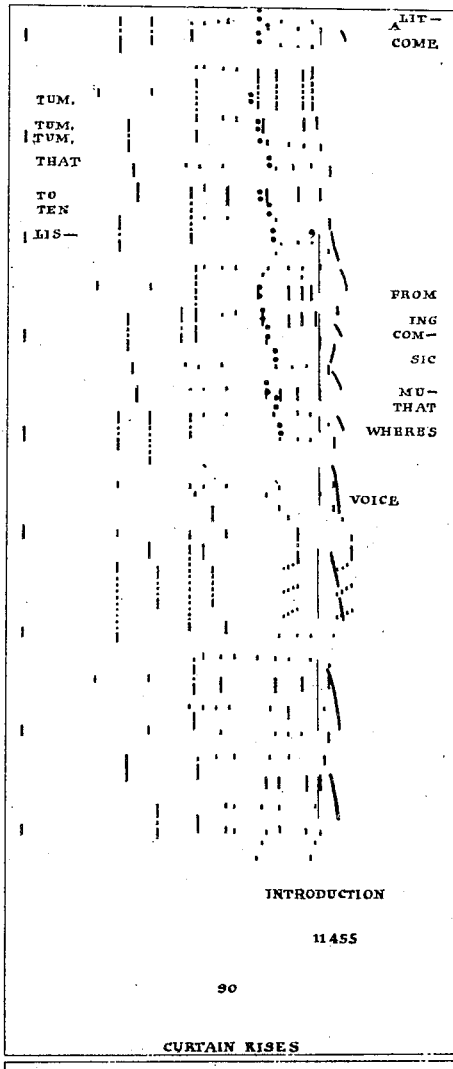

Figs. 2, 2ª, and 2ᵇ, are fragmentary face views of sections of a music-sheet, having printed thereon indicia for the direction and rendition of a home vaudeville performance.

Figs. 3 and 3ª are fragmentary face views of sections of a music-sheet, having printed thereon indicia for the direction and rendition of a folk dance.

In Figs. 1, 1ª, and 1ᵇ, I have illustrated sections of a player-piano music-sheet, having the usual note apertures therein, the usual musical interpretation indicia printed thereon, and in addition to the above-mentioned indicia, are printed words of direction for the use of the player-piano operator in conducting an amateur home minstrel production.

As shown at the bottom of Fig. 1, the printing indicates that the company, behind the scenes, possibly on an improvised stage, will sing the opening chorus, the music of the same being produced by the player-piano. The words of the chorus are printed upon the music-sheet in definite relation to the note apertures therein, for the guidance of the person operating the player-piano or for the singers.

As shown in Fig. 1ª, at the termination of the opening chorus and after a brief instrumental finale, the words "curtain rises" appear printed on the music-sheet, and after a short prelude by the piano, a second song is sung by the entire company, the words of the song being also printed along one margin of the music-sheet in definite relation to the note apertures of the said sheet.

After the second song, the interlocutor or the piano-player operator, taking the cue from the printed words placed on the music sheet, announces "Gentlemen be seated," the announcement being followed by a few musical cords by the piano.

A book of suitable minstrel jokes (not illustrated) is furnished with each roll, and after the printed directions on the music sheet "stop player," have been followed, these "joke numbers 1 and 2" are given by the company, after which the piano-player operator, or the interlocutor announces (in this case) "Sweet Marie sung by the minstrelsy's most gifted melodist, Mr. John Doe." This announcement having been printed upon and read from the music-sheet, the song by the person or persons selected follows, the words of which appear on the music-sheet at the side of and in definite relation to the note apertures thereof. After the song, the show continues. "jokes numbers 3 and 4" are given, another song or song duet, or monologue with musical accompaniment; and then a closing chorus.

It is to be understood that the character of the words and directions printed upon the music-sheets may be changed to give a variety of entertainment, their arrangement being such that the piano-player operator can intelligently direct the show and make such announcements as are necessary to its successful presentation.

In Figs. 2, 2ª and 2ᵇ, is illustrated sections of a type of music-sheet wherein are printed certain words and directions, designed to assist in the presentation of an amateur vaudeville performance.

On this music-sheet are placed first, the words "Curtain rises", following which, after a musical prelude by the piano-player, a song is sung, the words of the same being printed upon the margin of the music-sheet in definite relation to the note apertures of the said sheet, as hereinbefore described for the first-mentioned music sheet.

In the adaptation of this form of the invention (see Fig. 2ª) two persons may sing or speak alternately, following the accompaniment of the piano, the character of the speech or song being indicated by the printed directions carefully placed at each side of the music-sheet opposite the corresponding note apertures.

The vaudeville performance (in this instance) ends with a dance, after the vocal performance, as indicated in Fig. 2ᵇ, wherein the word "dance" is printed upon the music sheet, to guide the player operator in his announcement of the dancing act.

In Figs. 3 and 3ª is illustrated a type of music-sheet having printed thereon, in definite relation to the note apertures of the sheet, words of direction or dance calls for a folk dance, (in this case the Virginia reel) the words of direction being spoken by player-piano operator, to the dancers; for directing the dance figure. The words of the dance song are also placed in proper correspondence to the note apertures of the sheet, as a guide for a song rendition of the dance music with the piano accompaniment. Music sheets having printed thereon various other indicia can be supplied and the form of entertainment varied to suit the desires of buyers.

It is to be understood that I do not limit myself to the forms of the printed music-sheets herein specifically described, but contemplate their manufacture for use in other forms of entertainment.

The ends of whole sections or musical divisions in the compositions are marked by distinct attention directing or interpreting note apertures (7) between the divisions, functioning as introductory chords, sound signals or cues for the performers or for the audience as well as for the operator and independent of any directions or designations to the operator for verbal announcement.

The prelude annunciations and directions between music pause periods are printed in a pause space across the width of the record strip, as at 8, and any instructions, verbal designations, literary legends, prose description or such parts of the performance not a part of the musical composition or of musical consequence as playing directions or song words, are printed at appropriate positions, chronologically with the note apertures at an opposite side from the music indicia.

The record sheet aside from its musical features provides a diagram or program for an entertainment or dance, arranged along one side of the sheet or strip, to be conveniently legible and distinguishable from any music scoring or the like as a part of the musical composition arranged along the opposite side of the sheet.

Having described my invention, I claim:

1. A perforated music sheet for a mechanically operated musical instrument, provided with the words of a song located along one margin thereof in cooperative relation with their corresponding perforations and printed directions governing the actions of instrumentalities other than the operator of the instrument located along the other margin of the sheet and in non-operative relation to the note perforations.

2. A perforated music sheet for a mechanically operated musical instrument, provided with the word of a song located along one margin thereof in cooperative relation with their corresponding perforations and printed directions governing the actions of instrumentalities other than the operator of the instrument located along the other margin of the sheet.

In witness whereof, I hereunto subscribe my name, as attested by the two subscribing witnesses.

HARRY G. MILLER.

Witnesses:
L. A. BECK,
J. C. JUNUIS.